Aug. 21, 1934.　　　　A. HOSE ET AL　　　　1,970,963
VALVE
Filed Aug. 28, 1931　　　　6 Sheets-Sheet 1
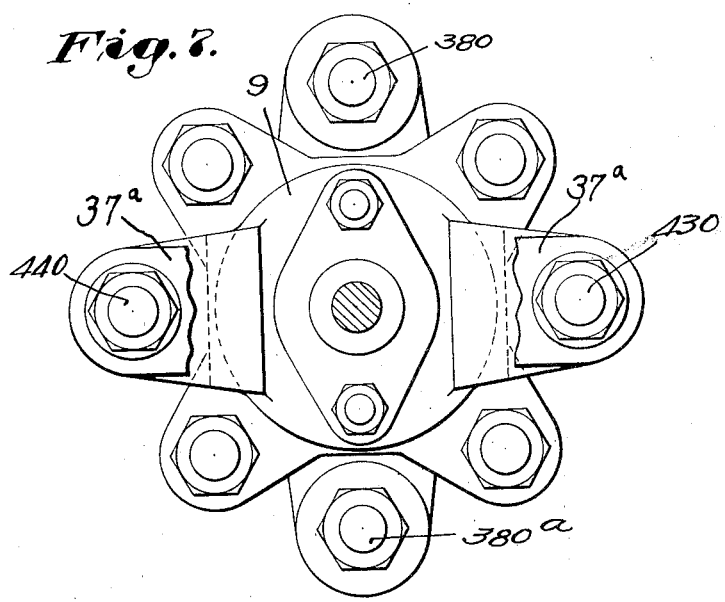
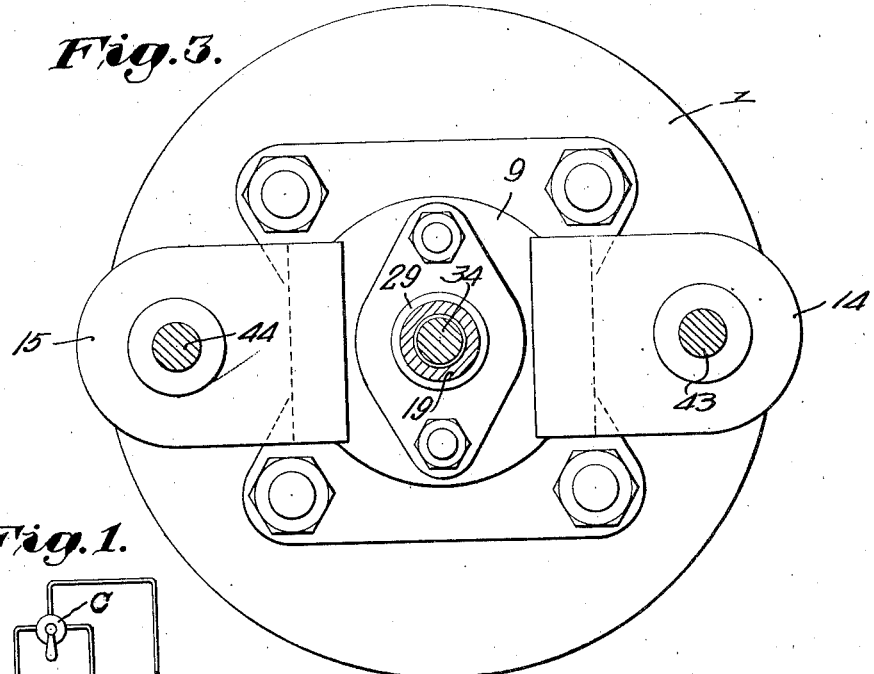
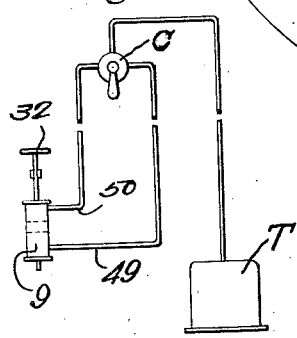
Inventors:
Alexander Hose,
Byron T. Atwood,
by Roberts, Cushman & Woodberry,
Attys.

Aug. 21, 1934.   A. HOSE ET AL   1,970,963
VALVE
Filed Aug. 28, 1931   6 Sheets-Sheet 2
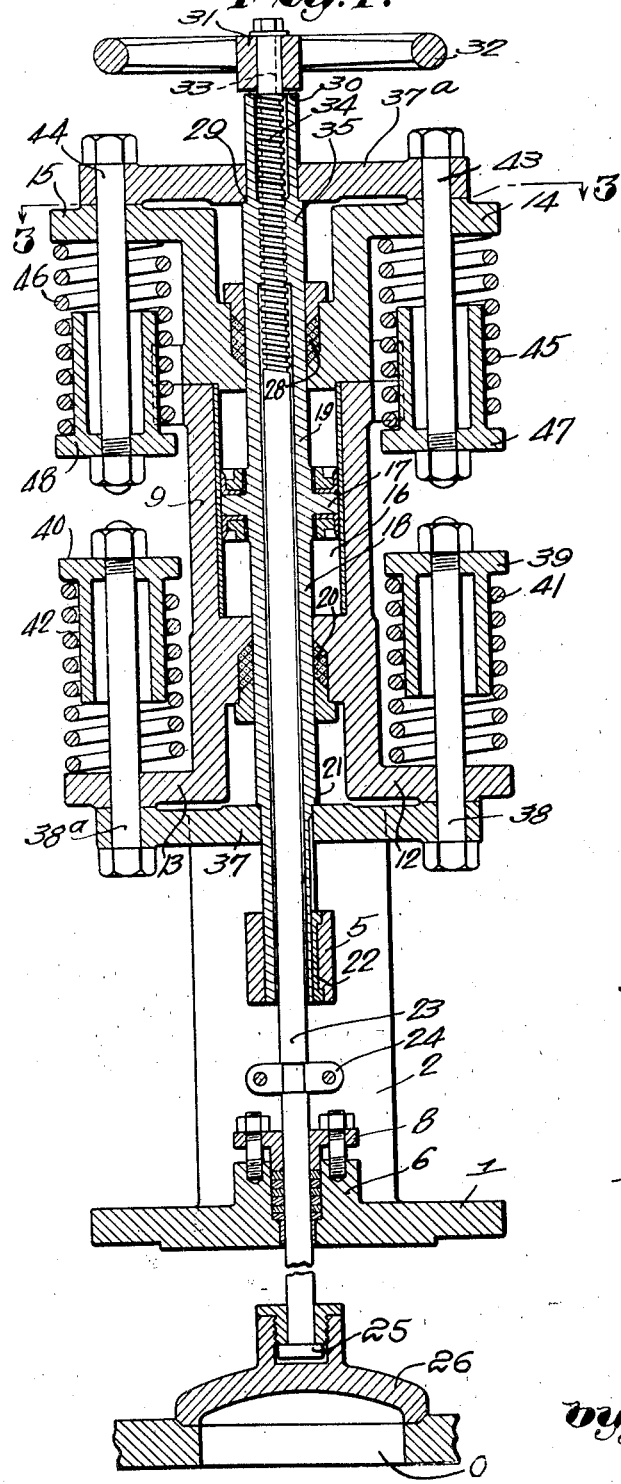
Fig. 1ª
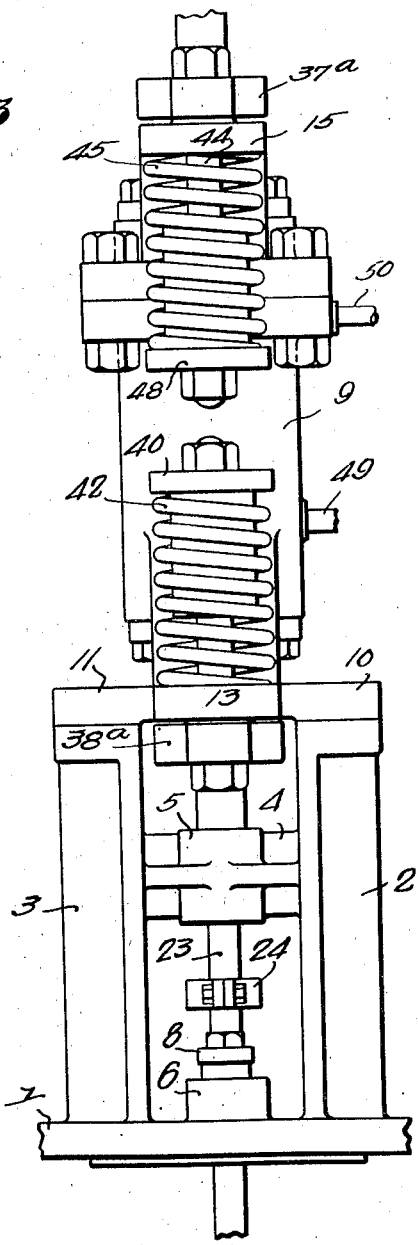
Fig. 2.
Inventors:
Alexander Hose
Byron T. Atwood
by Roberts, Cushman & Woodberry,
Attys.

Aug. 21, 1934.  A. HOSE ET AL  1,970,963
VALVE
Filed Aug. 28, 1931  6 Sheets-Sheet 3

Inventors.
Alexander Hose,
Byron T. Atwood,
by Roberts, Cushman & Woodberry
Attys.

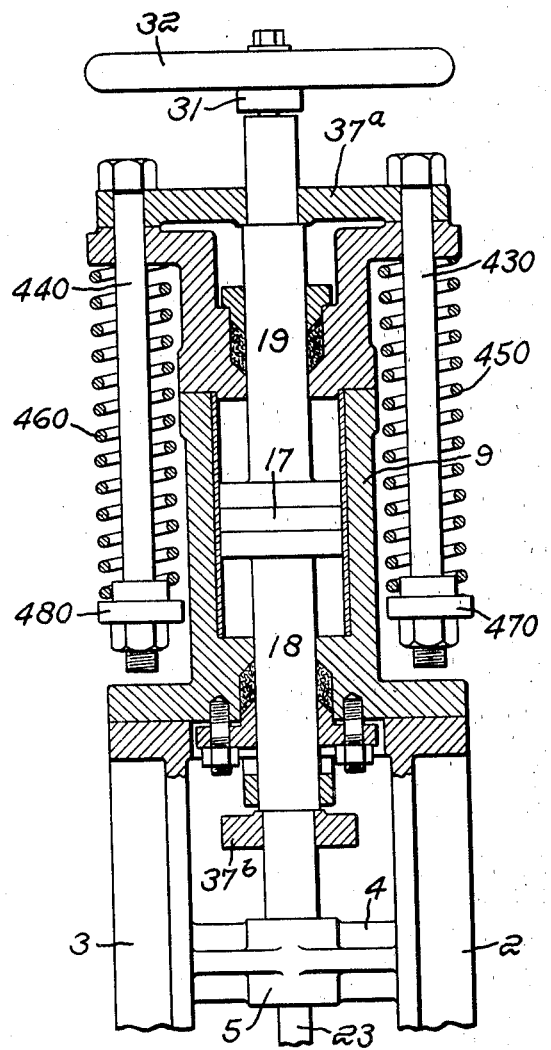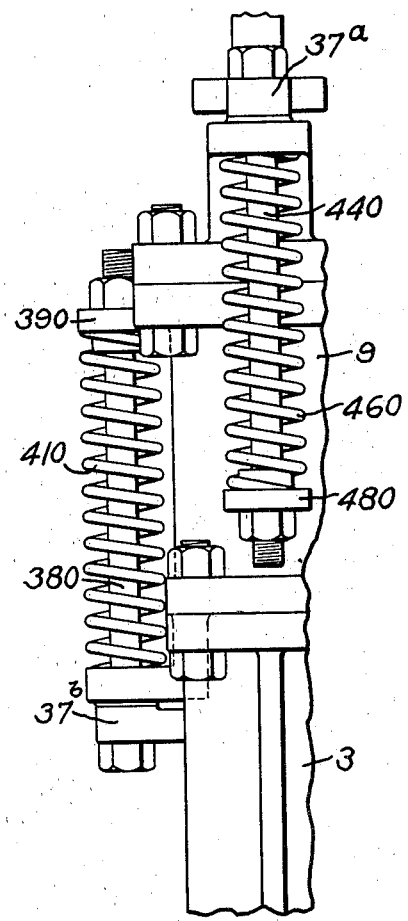

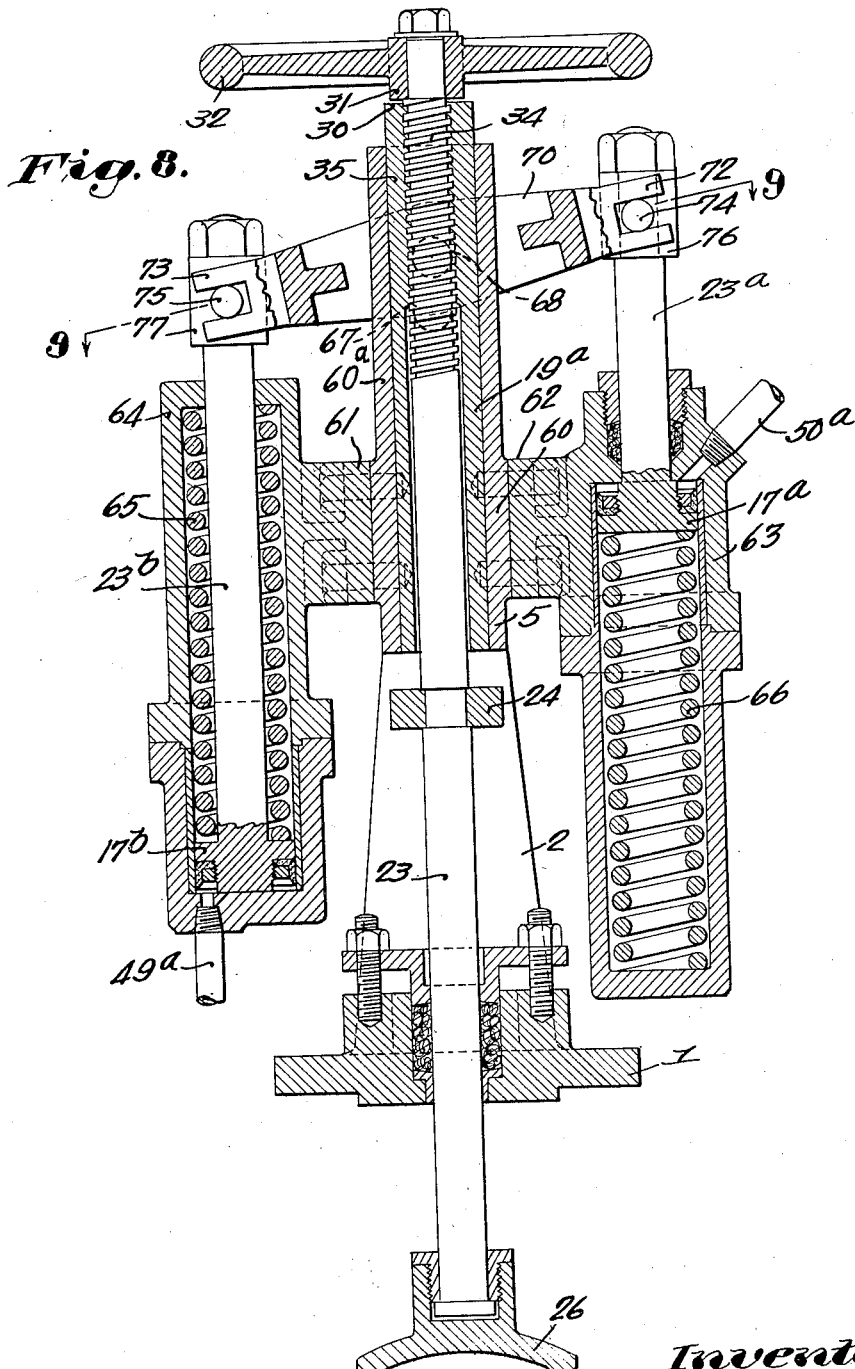

Aug. 21, 1934.     A. HOSE ET AL     1,970,963
VALVE
Filed Aug. 28, 1931     6 Sheets-Sheet 6

Inventors:
Alexander Hose,
Byron T. Atwood,
by Roberts, Cushman & Woodberry
Attys.

Patented Aug. 21, 1934

1,970,963

UNITED STATES PATENT OFFICE 1,970,963

VALVE

Alexander Hose and Byron Traften Atwood, Salem, Mass., assignors to Atwood & Morrill Co., Salem, Mass., a corporation of Massachusetts Application August 28, 1931, Serial No. 559,950

17 Claims. (Cl. 137—139)

This invention pertains to valves, and relates more particularly to valve actuating mechanism designed to permit operation of the valve by local control means, or alternatively by remote control means, without danger of interference in the operation of said controls.

Valve actuating mechanisms designed to provide either local or remote control are useful in various places, for example, in the collision bulkheads of ships. For this purpose the valves are commonly provided with hand wheels or similar actuating elements located in the bilge room where these actuating elements are normally available for operation, and are further provided with flexible or jointed shafts leading to an emergency wheel or operating element located above the level of the bulkhead deck. While in theory such an arrangement may appear adequate, it is found in practice that the length, weight and frictional resistance of the parts leading to the emergency control is so great as to make it quite difficult to move the valve by the means provided, and for this reason the operator in the bilge room, who is called upon to open or shut the valve frequently, often disconnects the devices leading to the remote emergency control so as to facilitate the local manual operation of the valve. Thus when an emergency has arisen, it has sometimes been found that the emergency control was no longer effective to move the valve.

In accordance with the present invention provision is made for opening and closing the valve by local means such as the usual hand wheel, while a fluid pressure motor, remotely controlled and supplied with pressure fluid from any suitable source, for example, a compressed air tank, is arranged for opening and closing the valve in such a way that the manual control is normally free and unimpeded by heavy connecting parts, so that the valve may be moved manually with no greater difficulty than is experienced in operating any ordinary outside screw and yoke type of valve, while, on the other hand, the manual and power control means are so inter-related as to prevent interference of one with the other such as might prevent proper opening or closing of the valve by either of the agencies provided.

The invention is capable of embodiment in various specific constructions and in the accompanying drawings we have illustrated certain selected embodiments by way of example, but without thereby intending to limit or restrict the scope of the invention beyond the purview of the appended claims.

In the drawings

Fig. 1 is a diagrammatic view illustrating the general arrangement of the valve actuating mechanism in a preferred construction;

Fig. 1a is a vertical section showing the valve and the means for actuating it;

Fig. 2 is a side elevation of the parts shown in Fig. 1a;

Fig. 3 is a section on the line 3—3 of Fig. 1a;

Fig. 5 is a similar view illustrating a further modification;

Fig. 6 is a fragmentary side elevation showing certain of the parts of the structure of Fig. 5;

Fig. 7 is a plan view of the device of Fig. 5, with certain parts broken away or in section;

Fig. 8 is a vertical section illustrating a further modified form of actuating means.

Figure 4:
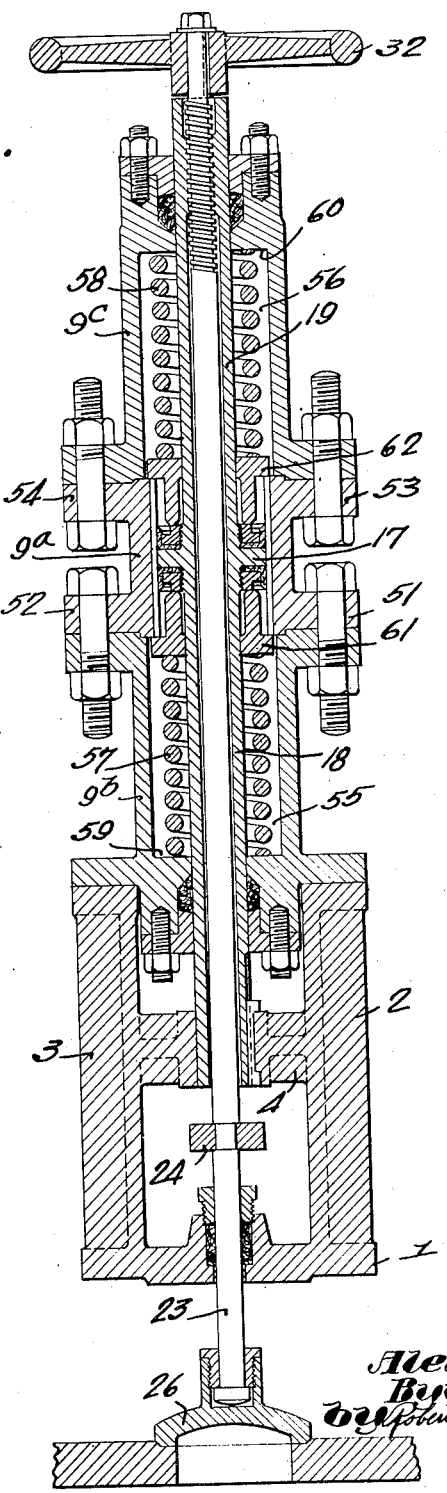
Fig. 4 is a view similar to Fig. 1a but illustrating a modified construction.

Referring to Figs. 1a, 2 and 3, the numeral 1 designates a base or supporting member which may be suitably anchored in any desired manner at the proper distance from the valve orifice which the device is intended to control. This base member 1 is provided with uprights 2 and 3 which are connected intermediate their ends by a transverse yoke 4 having a central boss 5 provided with a bearing bore for a purpose hereinafter described. The base 1 may also be furnished with an upstanding boss 6 providing a stuffing box chamber 7 with which cooperates a compression bushing 8.

This base structure supports the casing 9 having the lateral base flanges 10 and 11 (Fig. 2) adapted to rest upon and to be secured to the upper ends of the standards 2 and 3 respectively. The lower end of the casing 9 is furnished with a pair of oppositely directed outstanding lugs 12 and 13 (Fig. 1a) respectively and is furnished at its upper end with a similar pair of lugs 14 and 15. At its central part, the casing 9 is furnished with a cylindrical bore 16 lined, if desired, with wear-resistant material and forming a pressure chamber within which slides a piston 17. This piston is furnished with a tubular rod or sleeve comprising the downwardly extending part 18 and the upwardly extending part 19. The part 18 passes down through a stuffing box 20 below the cylinder 16, and is then reduced in diameter to provide a shoulder 21. Below this shoulder the rod or sleeve extends downwardly and through the bearing in the boss 5 above described, there being a spline connection 22 between the sleeve and the bearing boss such as to prevent rotation of the sleeve in the bearing while allowing relative longitudinal movement of the parts. The valve stem 23 is disposed within the tubular rod or sleeve 18 and extends down below the bearing 5 and is provided with a stop member 24 spaced from the lower end of the bearing 5 when the valve is in engagement with its seat. The lower end of the valve stem 23 is furnished with a swivel connection 25 to the valve disk 26 which cooperates with the seat 27 to close the orifice 0.

Above the piston 17 the hollow rod or sleeve member 19 extends upwardly through the packing box 28, and above this packing box it is reduced in diameter to provide a shoulder at 29. The sleeve portion 19 terminates at the point 30 at a distance slightly below the lower end of the hub 31 of the valve actuating wheel 32 which constitutes the manual or local controlling means for the valve. This hub 31 is keyed at 33 to the upper end of the valve stem 23 so that by rotating the wheel 32 the stem may be rotated. The upper part of the valve stem is screw threaded at 34 for engagement with an internal screw-threaded portion 35 of the tubular rod or sleeve 19, the latter thus constituting a nut for the threaded portion of the stem. Thus when the piston 17 is held stationary and the wheel 32 is rotated, the valve stem 23 moves upwardly or downwardly relatively to the piston.

The shoulder 21 of the sleeve 18 rests upon a yoke member 37 when the valve is seated, such yoke member being furnished at its ends with openings for the reception of bolts 38 and 38ª. These bolts extend upwardly through openings in the lugs 12 and 13, respectively, and through openings in the upper ends of spring centering members 39 and 40, respectively. These spring centering members are surrounded by coiled compression springs 41 and 42, respectively, whose upper ends bear against the heads of the members 39 and 40, and whose lower ends bear against the fixed lugs 12 and 13, respectively.

When the valve is closed, the shoulder 29 of the tubular member 19 bears against the under side of a yoke 37ª having openings at its opposite ends for the reception of bolts 43 and 44, respectively, which pass downwardly through openings in fixed lugs 14 and 15 and also through openings in the spring centering devices 47 and 48. Springs 45 and 46 encircle the centering devices, bearing against the heads of the latter at their lower ends and at their upper ends against the lugs 14 and 15. The several springs may be adjusted by means of nuts at the ends of the respective bolts, and are normally so tensioned as to oppose substantial resistance to the movement of the piston 17 in either direction.

The pressure cylinder 16 is provided with fluid inlet ports at points below and above the piston 17, such ports being connected by pipes 49 and 50, respectively, to a suitable source of pressure fluid, for example, a compressed air tank T (Fig. 1) with a suitable control valve C for controlling the delivery of pressure fluid to the cylinder 16 and its release therefrom. Such control valve may be of any usual and well known type, and is located at some remote point, for example, upon the deck above the bulkhead deck, if the apparatus is employed for the purpose above particularly noted.

Assuming that the apparatus is used for controlling a valve in a collision bulk-head of a ship, and that for ordinary purposes the valve is opened and closed by means of the hand wheel, 32, it may be noted that with the valve parts as shown in Fig. 1a, the valve is closed and the piston 17 substantially midway the length of the cylinder 16. As stated the springs 41, 42, and 45, 46 are now under substantial compression, tending to retain the piston 17 in the position shown. If it be desired to open the valve manually, the operator turns the hand wheel 32, which causes the valve stem 23 to rotate and thus by the engagement of its screw-threaded portion 34 with the internally-threaded portion 35 of the relatively fixed sleeve member 19, the valve is caused to recede from its seat 27. This movement may be continued until the stop 24 engages the end of the bearing 5. During this movement the hub of wheel 32 retreats from the end 30 of the sleeve 19. By reverse movement of the hand wheel the valve may be returned to its seat. It may be noted that in this manual actuation of the valve it is unnecessary to move anything except the valve and its actuating wheel and stem 23.

On the other hand, assuming that an emergency has arisen, such that the compartment in which the hand wheel 32 is located has been flooded so that local actuation of the valve is impossible, the valve may easily be opened by admitting pressure fluid into the cylinder 16 below the piston 17. When the pressure in the cylinder has been built up to the proper amount, the piston will begin to rise, together with its stem 19, and carrying the yoke 37ª with it, thus compressing the springs 45 and 46. During this movement the shoulder 21 moves away from the yoke 37 so that the springs 41 and 42 are not affected. To restore the valve to its seat by the remote control, it is merely necessary to release the pressure from below the piston 17, whereupon the springs 45 and 46, acting upon the yoke 37ª, will restore the stem 19 to its normal position. To insure positive closing, pressure fluid may be admitted above the piston 17,—driving the latter downwardly until it reaches its central position, at which point the valve 26 will engage its seat 27 thus preventing further movement. Thus the valve may be moved toward and from its seat by the manual local control or independently by the remote power control. If, after the valve has been opened by the hand control it be desired to close it by the remote control, it is merely necessary to admit pressure fluid above the piston 17. In fully opening the valve by the manual control, the stop 24 is brought into substantial engagement with the lower end of the sleeve, while the wheel hub 31 is moved away from the upper end 30 of the stem 19. If now the tubular piston rod 19 be moved downwardly (by admission of pressure fluid above piston 17), it carries the valve stem 23 with it, due to the threaded engagement of the parts 19 and 23, until the valve is closed. Since the stop 24 is now in engagement with the lower end of the sleeve member 18, it is impossible to open the valve by the manual means until the pressure has been released.

On the other hand if the valve has been opened from fully closed position by the remote control, it will be noted that the end 30 of the sleeve 19 is substantially in contact with the hub 31 of the hand wheel, while the stop 24 is in contact with the lower end of the boss 5. It is thus impossible by manipulation of the hand wheel to close the valve until the pressure has been released by actuation of the remote control.

Referring to Fig. 4, the parts which correspond to parts shown in Fig. 1a are designated by like reference characters. Thus the base 1 carries the uprights 2 and 3 united by the web 4 having the bearing boss 5 which serves as a guide for the lower member 18 of the hollow tubular stem of the piston 17, such stem having the upper part at 19. The valve stem 23 carries the valve 26 at its lower end and is provided with the stop 24 which is disposed at a point below the boss 5 when the valve is closed. At its upper end the stem 23 carries the hand wheel 32 constituting the local control element.

In this instance the casing $9^a$ provides the cylindrical chamber in which the piston 17 moves, but the casing $9^a$ is relatively short as compared to the casing 9 of Fig. 1a, and is provided with hollow extensions $9^b$ and $9^c$ which are secured to projecting lugs 51, 52, and 53, 54, respectively by means of suitable bolts. The extensions $9^b$ and $9^c$ constitute housings for the coiled compression springs 57 and 58, respectively. These springs bear at their outer ends against the bottom and top walls 59 and 60, respectively, of the housings, and at their inner ends against the heads 61 and 62, respectively, of sleeve members whose inner ends normally bear against portions of the piston 17.

The operation of this device is substantially like that of the device of Fig. 1a above described, it being noted that in this instance a single pair of springs opposes the movement of the piston 17, tending to hold the latter in its neutral position, and that such springs are housed within the apparatus so that they are not exposed to the corroding effects of sea water or other external agencies.

Referring to Figs. 5, 6 and 7 corresponding parts are also designated by similar reference characters. Thus the base (not shown) carries the uprights 2 and 3 which are united by the web 4 carrying the bearing boss 5 which guides the lower member 18 of the tubular piston rod, the upper extension 19 of the rod passing upwardly through an opening in the yoke $37^a$. The tubular piston rod has screw threaded connections (not shown) with the valve stem 23 carrying the stop member 24 and secured at its lower end to the valve (not shown) and at its upper end to the actuating wheel 32. The casing 9 is similar to that of Fig. 1a providing the cylindrical chamber for the piston 17. In this instance the transverse yoke $37^a$ corresponds to the yoke $37^a$ of Fig. 1 and is provided with openings at its opposite ends for the bolts 430 and 440 encircled by the compression springs 450 and 460, respectively, whose lower ends bear upon the adjustable collars 470 and 480 respectively. In this instance the springs of the other pair are disposed in a plane at right angles to that of the springs 450 and 460. Thus, as shown in Fig. 6, the yoke $37^b$ corresponding to the yoke 37 of Fig. 1a, is at right angles to the yoke $37^a$. This yoke $37^b$ is provided at its ends with holes for bolts 380 and $380^a$ (Fig. 7), respectively, encircled by coiled springs 410 adjustably tensioned by means of collars 390. This arrangement permits the use of longer springs than the arrangement of Fig. 1a, which in certain cases is advantageous. The operation of this device is substantially like that of Fig. 1a.

Figure 9:
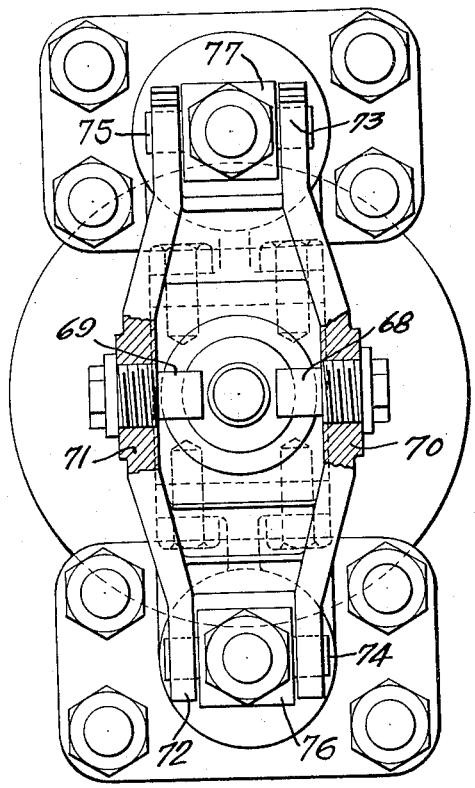
Fig. 9 is a section substantially on the line 9—9 of Fig. 8.

Referring to Figs. 8 and 9, a further modification of the device comprises the base 1 having uprights 2 which support a casing 60 having a lower bearing 5 and an upwardly extending bearing sleeve $60^a$. This bearing sleeve constitutes a guide for a tubular rod $19^a$ which receives the valve stem 23 carrying the valve 26 at its lower end. The valve stem is provided with the stop 24 disposed below the lower end of the bearing boss 5. The valve stem 23 has screw-threaded engagement at 34 with an internally-threaded portion 35 of the sleeve $19^a$. The hand wheel 32 has a hub 31 which, when the valve is closed, is closely adjacent to the upper end 30 of the sleeve $19^a$.

The casing 60 supports laterally disposed brackets 61 and 62 which carry cylinders 63 and 64 respectively. The cylinder 63 houses the piston $17^a$ while the cylinder 64 houses the piston $17^b$. A coil compression spring 66 within the cylinder 63 normally holds the piston $17^a$ against the top of the cylinder, while a similar compression spring 65 normally holds the piston $17^b$ against the bottom of its cylinder. Connections $50^a$ and $49^a$ lead into the top and bottom, respectively, of the cylinders 63 and 64 for admitting and exhausting pressure fluid therefrom.

The bearing sleeve $60^a$ is furnished at its opposite sides with elongate slots 67 (Fig. 8), while the tubular rod $19^a$ is furnished at opposite sides with openings adapted to receive the ends of trunnions 68 and 69 (Fig. 9), respectively, which pass inwardly through the slots 67. These trunnions are carried by a yoke comprising the spaced members 70 and 71 (Fig. 9) united at their opposite ends, the yoke having forked extremities 72 and 73 respectively, which engage over pins 74 and 75 projecting from collars 76 and 77 secured to the upper ends of the piston rods $23^a$ and $23^b$ respectively, secured to the pistons $17^a$ and $17^b$, respectively, and projecting upwardly through suitable guides at the upper ends of the cylinders 63 and 64.

In the normal position of the parts, with the valve 26 against its seat, the springs 65 and 66 are under compression sufficient to prevent movement of the yoke member when the hand wheel 32 is operative. For example, these springs may be under a compression of approximately 400 lbs. Normally when the remote control device is inactive, the pistons $17^a$ and $17^b$ occupy the positions shown in Fig. 8 and the valve 26 may be moved toward and from its seat freely by the use of the hand wheel 32 without moving the sleeve $19^a$ or any of the parts attached thereto.

If, when the valve has been opened by hand, it be desired to close it by the remote control, the remote control valve is manipulated to admit pressure fluid, for example, compressed air, oil or water, to the cylinder 63 at a point above piston $17^a$. Since the spring 65 is under substantial compression, the pin 75 now acts as a fixed fulcrum point and as the piston $17^a$ moves downwardly in the cylinder 63, the yoke member swings about the pin 75 as an axis, thus pushing the stem $19^a$ downwardly and closing the valve.

Since, in the manual opening of the valve, the stop 24 was carried substantially to contact with the lower end of the sleeve $19^a$, it is impossible, when the valve has been closed by power as above described, to open it by manipulation of the hand wheel. However, when it be desired to open the valve, the pressure fluid is released from the cylinder 63, whereupon the piston $17^a$ is raised by the spring 66 restoring the valve to open position, from which position it may be closed by hand when desired.

If the valve has been closed by hand and it be desired to open it by the remote control, the remote control valve is turned to admit pressure fluid to the cylinder 64, thus raising the piston $17^b$. At this time the pin 74 acts as a fixed fulcrum and the yoke swings upwardly about said pin, thus raising the valve from its seat. It is noted that when the valve is closed by hand, the hub 31 of the wheel 32 comes into close proximity to the upper end 30 of the sleeve 19ª and thus when the valve has been opened by power, it is impossible to close it by manipulation of the hand wheel. By release of the pressure fluid from cylinder 64, the valve may be closed by the action of the spring 65. It may be further noted that when the valve has been closed by hand, it is impossible to close it further by application of the power, since the valve is limited by contact with the valve seat, and thus the valve can not be displaced by such application of closing pressure in such a way that upon application of pressure to open it, it will not open properly.

While certain desirable embodiments of the invention have been disclosed by way of example, it is to be understood that the invention is not limited thereto, but that other and equivalent constructions, variations in size, and proportion of parts and obvious rearrangements of the same may be made without departing from the scope of the invention.

We claim:

1. The combination of a valve having a reciprocable stem, manual means for moving the stem to open and close the valve, other means for moving the stem for opening and closing the valve, the manual means being free to move the valve while said other means remains inactive, and means to prevent opening and closing of the valve by the manual means when said other means is in action.

2. The combination of a valve having a stem provided with a threaded portion, said stem being movable through a full stroke for moving the valve between closed and fully open positions, said stem also being movable through part strokes for moving the valve to intermediate positions, a nut member engaging said threaded portion, remotely controlled means for determining the position of the nut member to hold the valve at an intermediate or other position, and local means for turning the stem whereby to advance or retract the valve relatively to the nut member.

3. The combination with a valve having a screw threaded stem, of an internally screw threaded sleeve constituting a nut member, means preventing rotation of the sleeve, means for rotating the stem, a power cylinder, a piston within the cylinder, said piston being connected to the stem to move the latter axially, the stem having spaced abutment portions, a yoke member engaging the respective abutments, fixed stops limiting movement of each yoke member toward the other while permitting separation of the yoke members, loading springs normally holding each yoke member in contact with its respective stop, and means operative at will for moving the sleeve in either direction, thereby to move the corresponding yoke member away from its stop while storing up energy in the corresponding spring without substantially affecting the other spring.

4. The combination of a valve having a stem, a movable sleeve member guiding the stem for axial movement, local means for moving the stem longitudinally and relatively to the sleeve, resilient means normally holding the sleeve in a predetermined neutral position, and remote controlled power means for moving the sleeve and with it the stem in either direction from its predetermined neutral position.

5. The combination of a valve having a stem, a movable sleeve member guiding the stem for axial movement, local means for moving the stem longitudinally and relatively to the sleeve, a pressure fluid motor having a cylinder, a piston in the cylinder, the piston being connected to the sleeve, means tending to hold the piston and sleeve in mid-position in the cylinder, and remote means for selectively determining the delivery of pressure fluid to either end of the cylinder.

6. The combination of a valve and actuating means therefor, the actuating means comprising a manually operated control device for opening and closing the valve, and power operated means for opening and closing the valve, the manually operated device moving freely and independently of the power operated means, and means to prevent operation of the manual control device when the valve has been opened by the power means.

7. The combination of a valve having a screw threaded stem with actuating means comprising an internally screw threaded sleeve constituting a nut member, means preventing rotation of the sleeve, the sleeve being reduced in external diameter at spaced points to provide abutment portions, load applying members normally engaging the respective abutment portions, fixed stop means limiting movement of said load applying members toward each other, the load applying members being movable away from said stops and from each other, an independent loading spring for each load applying member, the springs normally holding the load applying members in contact with their respective abutments when the sleeve is in a predetermined neutral position, means for adjusting the normal force exerted by the springs, and means for moving the sleeve axially, one abutment shoulder of the sleeve leaving its loading member during such movement while the other abutment shoulder carries its loading member with it away from the stop means, thereby storing up energy in the corresponding spring.

8. The combination of a valve having a screw threaded stem with actuating means comprising a nut member engaging said stem, said nut member carrying a piston, a power cylinder within which the piston slides, means to prevent rotation of the nut member, means for rotating the stem, means for admitting pressure fluid to and relieving it from the cylinder, whereby to move the piston and nut member, and resilient means normally tending to hold the nut member in predetermined position, stop means for limiting movement of the stem relatively to the sleeve, and a stationary abutment cooperable with stop means on the stem to limit movement of the stem.

9. The combination of a valve having a screw threaded stem with actuating means comprising an elongate axially movable tubular sleeve having screw threaded engagement with the stem and constituting a nut member, means for turning the stem comprising a part adapted to engage the end of said sleeve whereby to limit relative movement of the stem and sleeve in one direction, stop means engageable with the opposite end of the sleeve to limit relative movement of the sleeve and stem in the other direction, a fixed abutment engageable by said stop means, and means for moving the sleeve together with the stem.

10. The combination of a valve having a stem with actuating means comprising a fixed casing having a power cylinder, a piston therein, a tubular piston rod through which the valve stem extends, the stem and piston rod having screw threaded engagement whereby rotation of the stem causes it to move axially of the piston rod, means to prevent rotation of the piston rod, means for rotating the stem, opposed springs normally holding the piston in a neutral position with sufficient force to keep it stationary during manual operation of the stem and valve, and means for admitting pressure fluid to either end of the cylinder at will, whereby to move the piston and sleeve in opposition to one of the respective springs, thereby to move the valve by power in one or the other direction.

11. The combination with a valve having a stem, of means for actuating the valve comprising local means for moving the stem in an axial direction, remotely controlled means for moving the stem in an axial direction, said latter means comprising a sleeve embracing the stem, opposed loading means tending to prevent movement of the sleeve in either direction, said loading means being independent and unaffected one by the other, and remote controlled power means for moving the sleeve in either direction at will in opposition to one of the respective loading means.

12. The combination with a valve having a screw threaded stem and an axially movable nut member engaged therewith, means for preventing the rotation of the nut member, means for rotating the stem, a pair of opposed loading springs, stops to limit the opposing action of the springs whereby the nut member is normally held in a predetermined neutral position, and means for moving the nut in opposition to either of said loading springs.

13. The combination with a valve having a screw threaded stem, of a screw threaded non-rotatable sleeve constituting a nut member, means for rotating the stem, a pair of motor devices for positively moving the sleeve in opposite directions respectively, means for energizing either of said motor devices at will, and means for transmitting motion from either motor device to the sleeve.

14. Valve operating mechanism comprising a stem and a member having screw-threaded engagement with the stem, and means for relatively rotating the stem and member thereby to effect axial movement of the stem relative to said member to actuate the valve, means for applying a predetermined pressure to hold said member in a substantially fixed mid-position, and fluid pressure means operative to apply a greater pressure to overcome said predetermined pressure to effect bodily movement of said member selectively in either of opposite directions from said mid-position and thereby to actuate the valve.

15. Valve operating mechanism comprising a stem having a screw-threaded portion, and an internally screw-threaded sleeve member engaging the threaded portion of the stem, and means for rotating the stem thereby to effect axial movement of the stem relative to said member to actuate the valve, resilient means for substantially continually applying pressure to hold said member in a substantially fixed mid-position, and means for applying fluid pressure to overcome the pressure of the resilient means and to effect bodily movement of said member selectively in either of opposite directions from said mid-position and thereby positively to move the valve toward or from its seat.

16. Valve operating mechanism comprising a stem having a screw-threaded portion, and an internally screw-threaded sleeve embracing said threaded portion of the stem, and a hand wheel for turning the stem thereby to effect axial movement of the stem in opposite directions relative to said member to actuate the valve, continually effective means for applying a predetermined pressure to hold said member in a substantially fixed position, and fluid pressure means for applying pressure to overcome said predetermined pressure to effect bodily movement of said member selectively in either of opposite directions thereby to actuate the valve.

17. Valve operating mechanism comprising a stem provided with a hand wheel for turning it, said stem having a screw-threaded portion, and an internally screw-threaded sleeve member with which said threaded portion of the stem engages whereby rotation of the hand wheel effects axial movement of the stem relative to said member to actuate the valve, means for holding said member in a predetermined position so that relative movement of the stem will actuate the valve, means for effecting bodily movement of the stem and of said member in opposite directions from said position while retaining these parts substantially fixed relative to each other for actuating the valve.

ALEXANDER HOSE.
BYRON TRAFTEN ATWOOD.